United States Patent
Momchilov et al.

(10) Patent No.: US 11,803,398 B2
(45) Date of Patent: Oct. 31, 2023

(54) COMPUTING DEVICE AND ASSOCIATED METHODS PROVIDING BROWSER LAUNCHING OF VIRTUAL SESSIONS IN AN APPLICATION

(71) Applicant: CITRIX SYSTEMS, INC., Fort Lauderdale, FL (US)

(72) Inventors: Georgy Momchilov, Parkland, FL (US); Hubert Divoux, Parkland, FL (US); Santosh Gummunur Chiranjeevi Sampath, Bangalore (IN); Deepak Sharma, Bangalore (IN)

(*) Notice: Subject to any disclaimer, the term of this patent is extended or adjusted under 35 U.S.C. 154(b) by 31 days.

(21) Appl. No.: 17/448,531

(22) Filed: Sep. 23, 2021

(65) Prior Publication Data

US 2022/0261260 A1 Aug. 18, 2022

Related U.S. Application Data

(60) Provisional application No. 63/149,807, filed on Feb. 16, 2021.

(51) Int. Cl.
*G06F 9/451* (2018.01)
*H04L 65/1069* (2022.01)
*G06F 16/958* (2019.01)
*H04L 9/40* (2022.01)
*H04L 65/401* (2022.01)

(52) U.S. Cl.
CPC .......... *G06F 9/452* (2018.02); *G06F 16/958* (2019.01); *H04L 63/0428* (2013.01); *H04L 65/1069* (2013.01); *H04L 65/401* (2022.05)

(58) Field of Classification Search
CPC ... G06F 9/452; G06F 16/958; H04L 63/0428; H04L 65/1069; H04L 65/401
USPC .......................................................... 709/217
See application file for complete search history.

(56) References Cited

U.S. PATENT DOCUMENTS

| | | | |
|---|---|---|---|
| 8,132,247 B2 | 3/2012 | Adhya et al. | |
| 8,443,358 B1 | 5/2013 | Larkin et al. | |
| 9,009,327 B2 | 4/2015 | Adhya et al. | |
| 9,154,328 B2 | 10/2015 | Suganthi et al. | |
| 9,219,579 B2 | 12/2015 | Rao et al. | |
| 9,596,236 B2 | 3/2017 | Dunn et al. | |
| 9,690,954 B2 | 6/2017 | Nord et al. | |
| 9,800,669 B2 | 10/2017 | Bell | |
| 10,778,591 B2 | 9/2020 | Ramaiah et al. | |
| 2006/0101341 A1* | 5/2006 | Kelly ................... | G06F 3/04812 707/E17.119 |
| 2012/0042365 A1 | 2/2012 | Shoval et al. | |
| 2012/0246701 A1* | 9/2012 | Swamy .................. | G06F 17/00 726/4 |

(Continued)

FOREIGN PATENT DOCUMENTS

WO   WO 2009/027409   3/2009
WO   WO2020/23694    11/2020

*Primary Examiner* — Meng Vang

(57) ABSTRACT

A computing device may include a memory and a processor configured to cooperate with the memory to run a browser configured to generate a user interface to display a virtual session from a host computing device, and an application configured to establish a connection with the host computing device. The processor may further run code configured to cause the browser to connect with the host computing device using the connection established by the application to display the virtual session within the user interface.

15 Claims, 16 Drawing Sheets

(56) References Cited

U.S. PATENT DOCUMENTS

| | | | |
|---|---|---|---|
| 2012/0331406 A1* | 12/2012 | Baird | G06F 16/95 |
| | | | 715/760 |
| 2013/0219468 A1* | 8/2013 | Bell | H04L 63/0428 |
| | | | 726/4 |
| 2016/0099955 A1* | 4/2016 | Wespel | H04L 63/1466 |
| | | | 726/23 |
| 2017/0132624 A1 | 5/2017 | Muchang et al. | |
| 2017/0339250 A1* | 11/2017 | Momchilov | H04L 67/34 |
| 2018/0091602 A1* | 3/2018 | Fan | H04L 65/4015 |
| 2018/0219849 A1* | 8/2018 | Jones | H04L 67/53 |
| 2019/0356701 A1* | 11/2019 | Prabhu | H04L 65/4061 |

* cited by examiner

COMPUTING DEVICE AND ASSOCIATED METHODS PROVIDING BROWSER LAUNCHING OF VIRTUAL SESSIONS IN AN APPLICATION

RELATED APPLICATIONS

This application claims the benefit of provisional application Ser. No. 63/149,807 filed Feb. 16, 2021, which is hereby incorporated herein in its entirety by reference.

BACKGROUND

Many organizations are now using applications to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. Virtual Desktop Infrastructure (VDI) refers to the process of running a user desktop inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A computing device may include a memory and a processor configured to cooperate with the memory to run a browser configured to generate a user interface to initiate virtual sessions from a host computing device, and an application configured to establish a connection with, and display virtual sessions from, the host computing device. The processor may further run code configured to cause the application to connect with the host computing device using the connection and display a virtual session responsive to initiation by the browser.

In an example embodiment, the browser may have a browser type associated therewith, and the processor may be further configured to run a messaging host associated with the browser type for relaying communications between the code and the application. Moreover, the browser may comprise a plurality of browsers having different browser types, the messaging host may comprise a different message host associated with individual browser types, and the application may comprise a common connection manager configured to communicate with the different message hosts.

In one example implementation, the application may be configured to store a connection lease bound to the application in the memory, and establish the connection based upon the connection lease. Additionally, the code may be further configured to synchronize the connection lease with a connection lease service. Furthermore, the connection lease may have a private/public key pair associated therewith, the connection lease may be generated based upon the public key, and the application may be configured to access the private key and validate the connection lease based upon the private key.

In accordance with an example embodiment, the application may store a connection ticket in the memory and establish the connection with the host computing device based upon the connection ticket. In accordance with another example, the code may be a browser extension, and the application may be configured to determine a capability associated with the browser extension and communicate with the browser extension based upon the determined capability.

The browser may be configured to generate the user interface based upon a user interface cache, and the application may be configured to obtain the user interface cache from a resource. By way of example, the code may be a browser extension and the application may be further configured to store the user interface cache in the memory, obtain updates to the user interface cache from the resource, and provide the stored user interface cache to the browser through the browser extension responsive to unavailability of the cloud authentication store to provide updates.

In accordance with one example, the code may be a browser extension and the application may be configured to establish the connection responsive to the browser initiating the virtual session based upon the browser extension. Additionally, the browser may be configured to generate the user interface responsive to the native application establishing the connection based upon the browser extension.

A related method may include running a browser at a computing device configured to generate a user interface to initiate virtual sessions from a host computing device, and running an application at the computing device configured to establish a connection with, and display virtual sessions from, the host computing device. The method may further include running code at the computing device configured to cause the application to connect with the host computing device using the connection and display a virtual session responsive to initiation by the browser.

A related non-transitory computer-readable medium may have computer-executable instructions for causing a computing device to perform steps including running a browser at a computing device configured to generate a user interface to initiate virtual sessions from a host computing device, and running an application at the computing device configured to establish a connection with, and display virtual sessions from, the host computing device. The steps may further include running code at the computing device configured to cause the application to connect with the host computing device using the connection and display a virtual session responsive to initiation by the browser.

DETAILED DESCRIPTION

One approach to connecting user computing devices to virtual sessions involves connection leases, which provide long-lived and mostly static entitlements to published resources the users are entitled to access. This not only makes the connection lease secure, it also allows the connection leases to be relatively long-lived in that they can be updated on a less frequent basis (e.g., to account for changes in user permissions, network addresses, etc.). However, challenges may occur when attempting to access published resources through a browser, as browsers do not offer the same level for asset storage (e.g., connection leases, private/public key pairs, etc.) as do native applications on an endpoint device which have access to a Trusted Platform Module (TPM), for example. Moreover, browsers typically do not have the same level of persistence as a native app, in that browsers may clear their cache upon exit. Moreover, browsers may have a relatively limited lifetime in that they can be closed by a user after a brief use, which diminishes the opportunity for background operations that are important for resiliency.

The systems and methods described herein overcome these technical challenges by leveraging the secure connection and persistence capabilities of a native application for use in browser launches of virtual sessions. This approach allows for users to maintain a familiar user experience with the browser, yet at the same time experience better performance (e.g., for graphics and multimedia) by leveraging the capabilities of the native app to securely connect with a virtual session host. Moreover, background operations such as connection lease and security key updates may be delegated to the native application to be performed after the browser is closed, leading to enhanced resiliency by maintaining up-to-date connection lease and authentication data.

Figure 1:
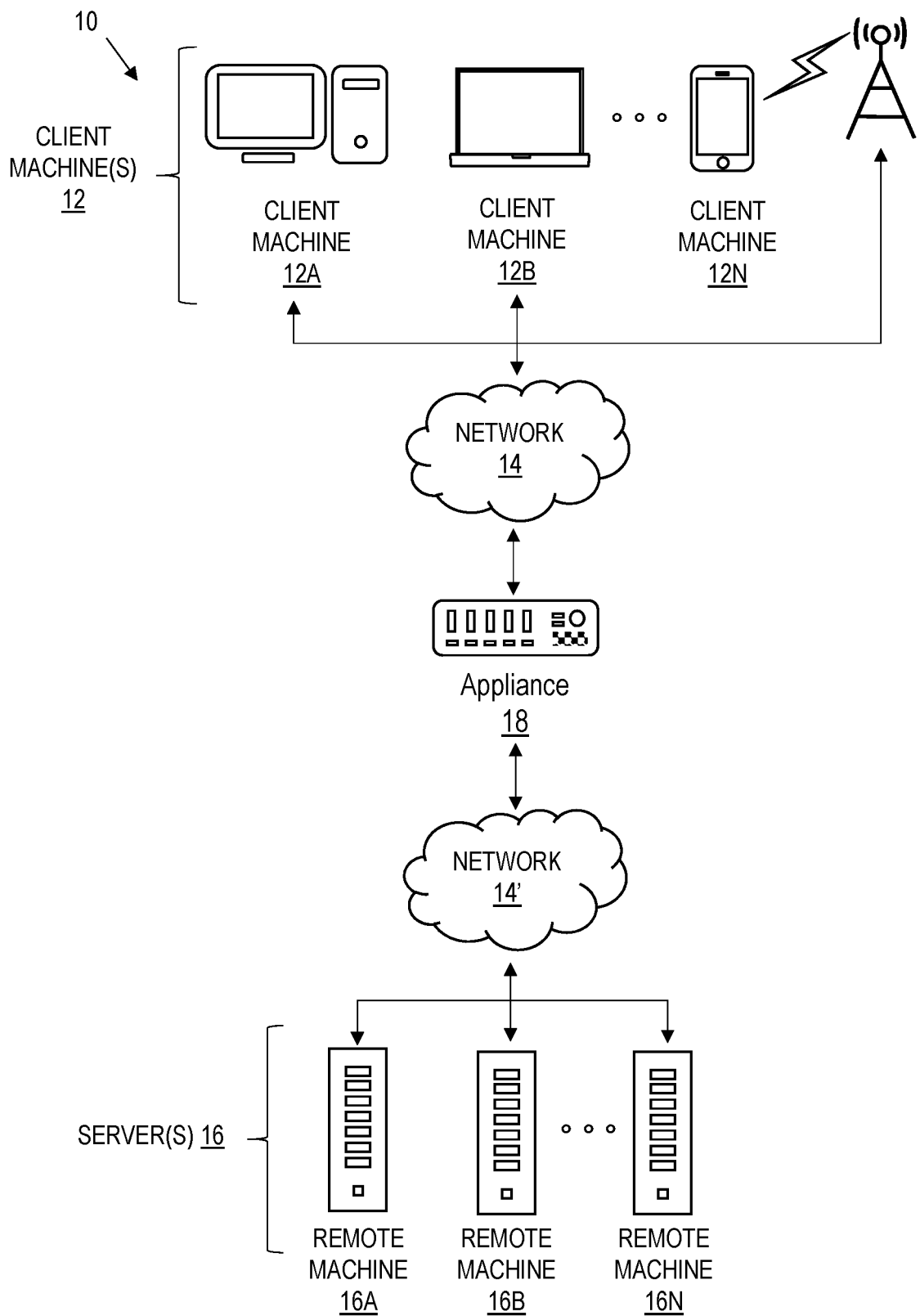
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
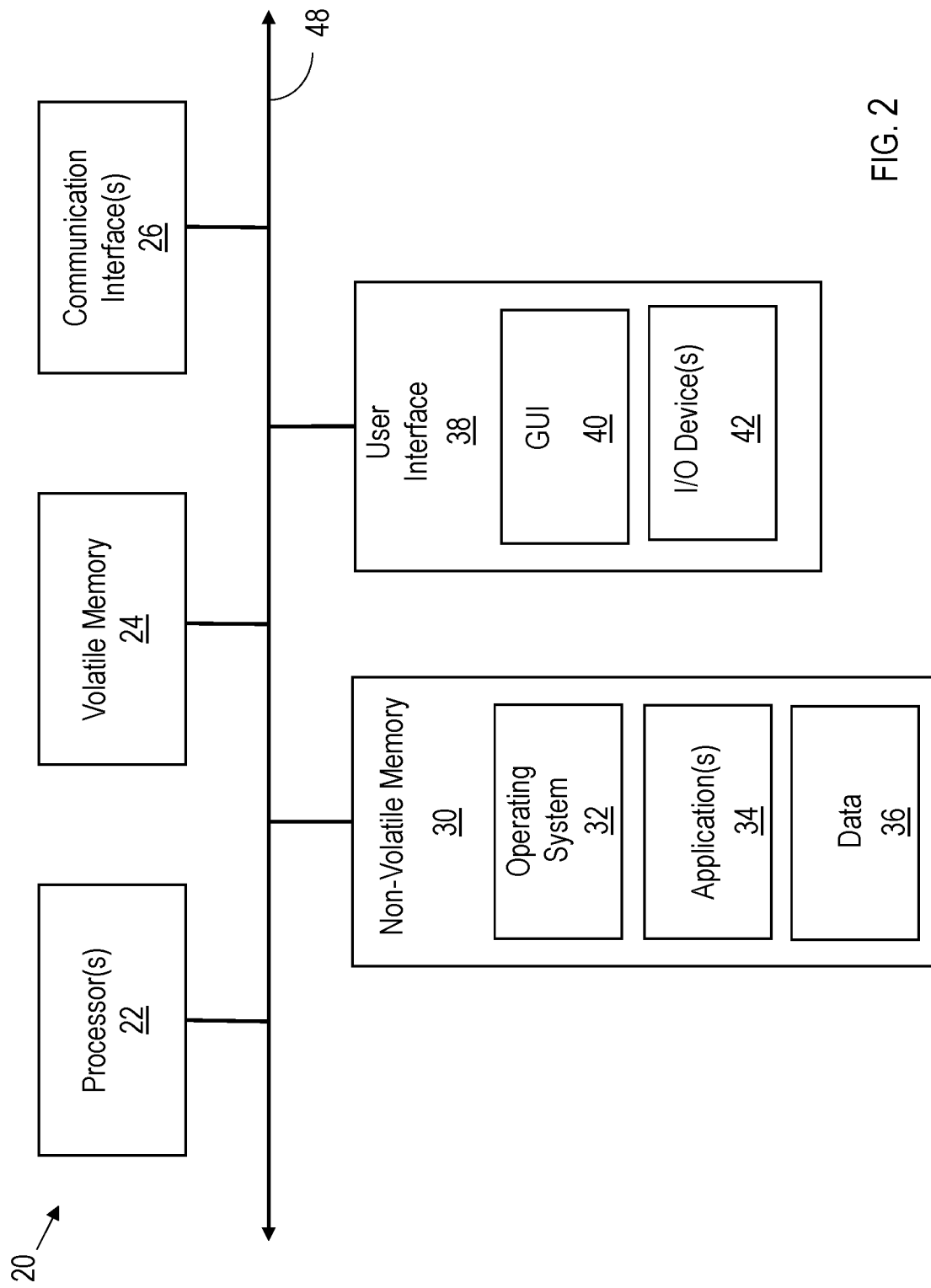
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
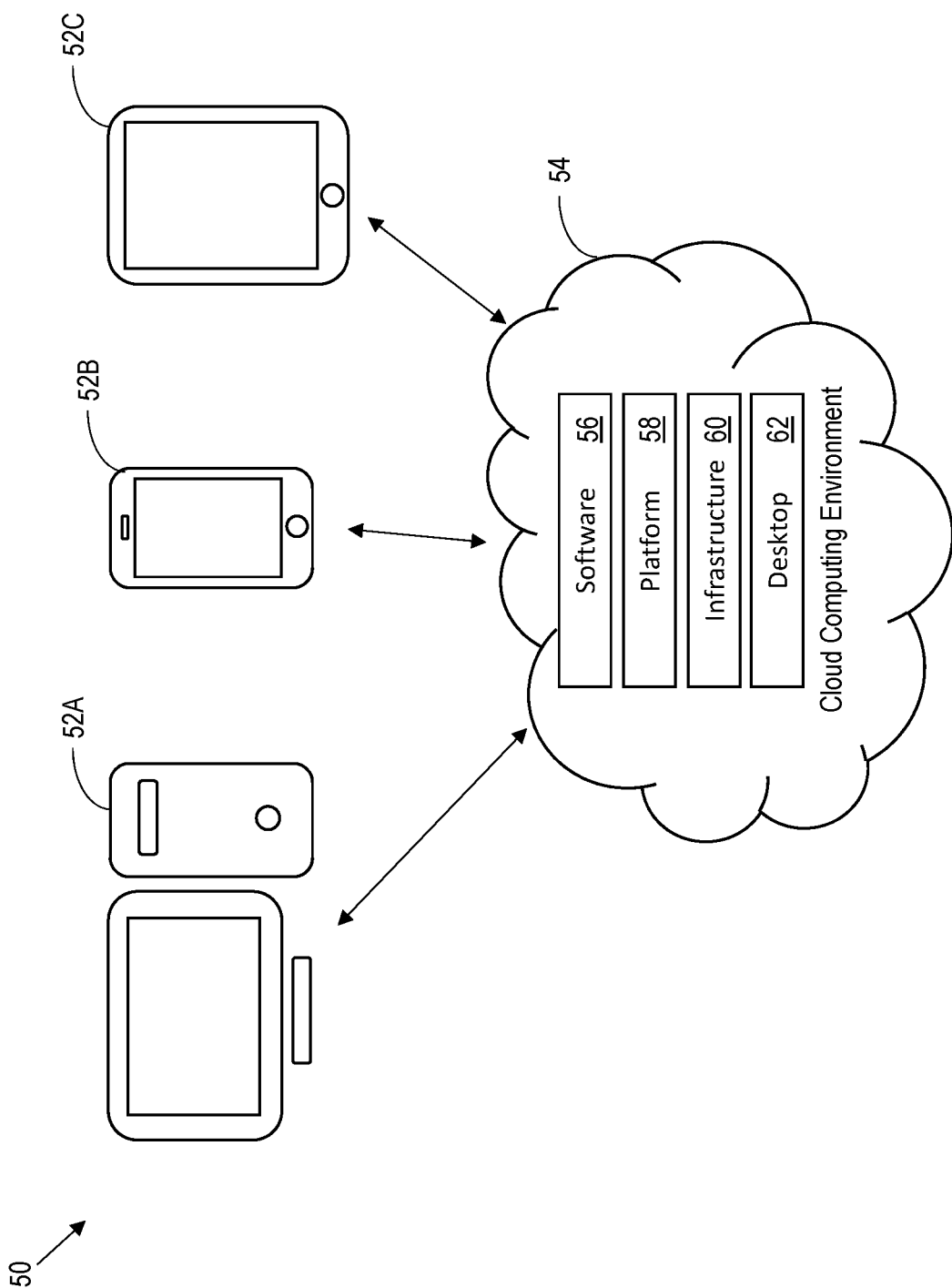
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
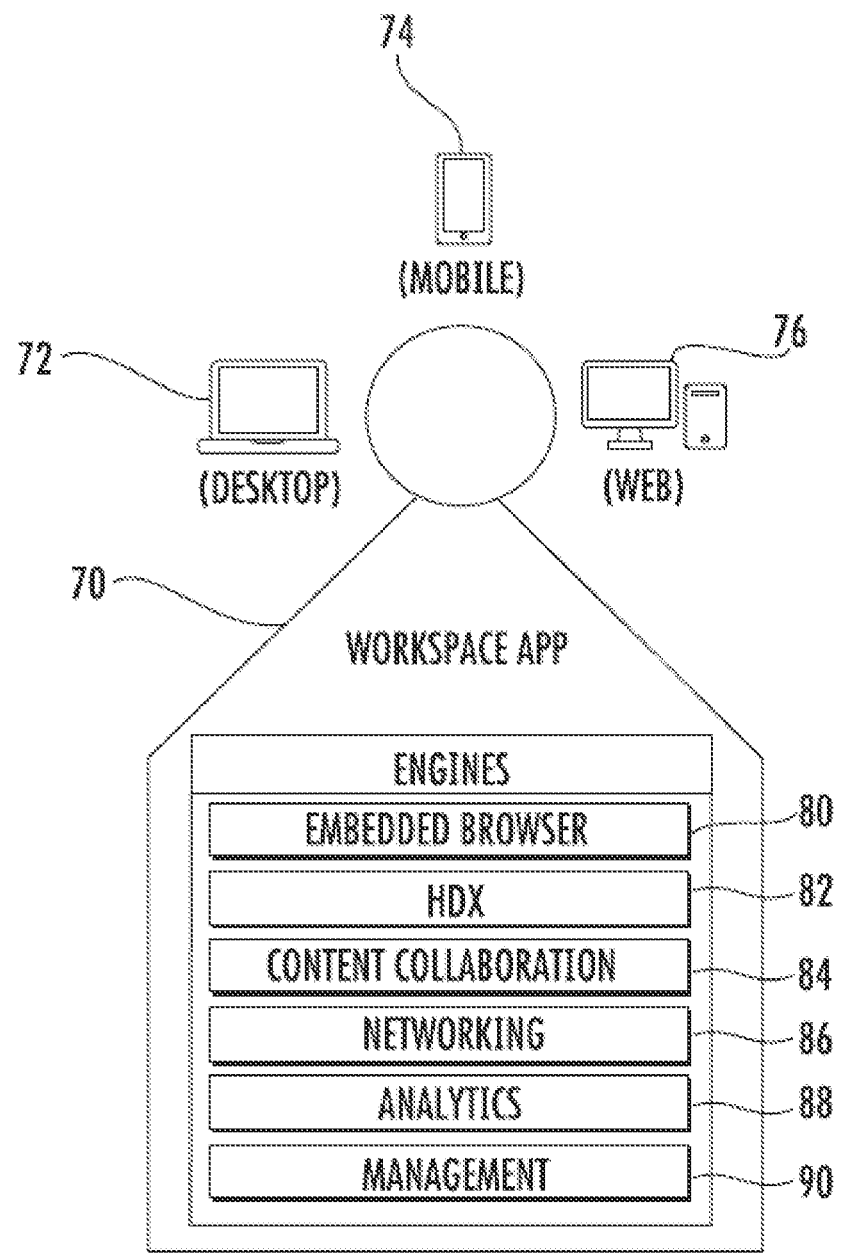
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific µ-VPN connection. A µ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
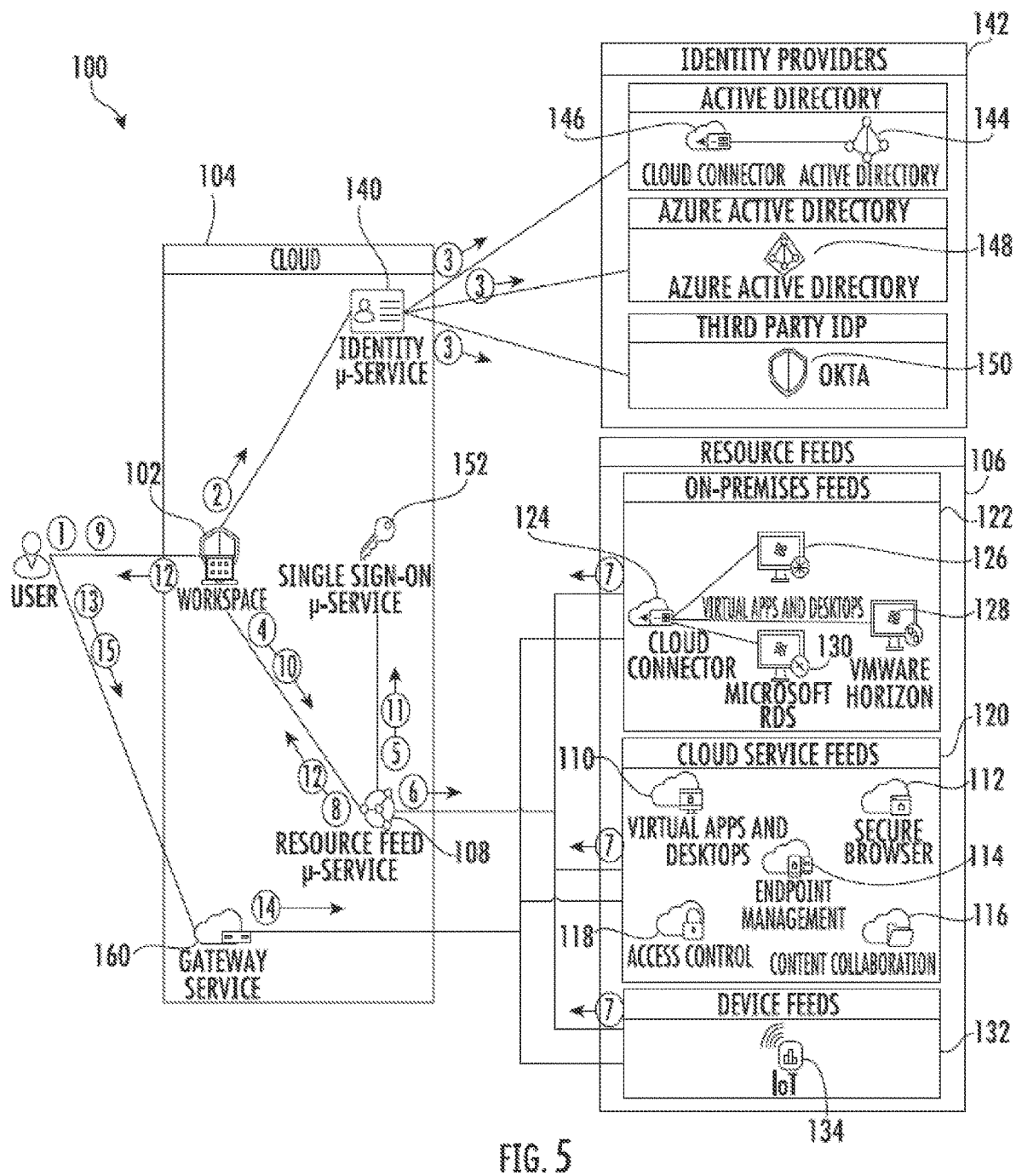
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
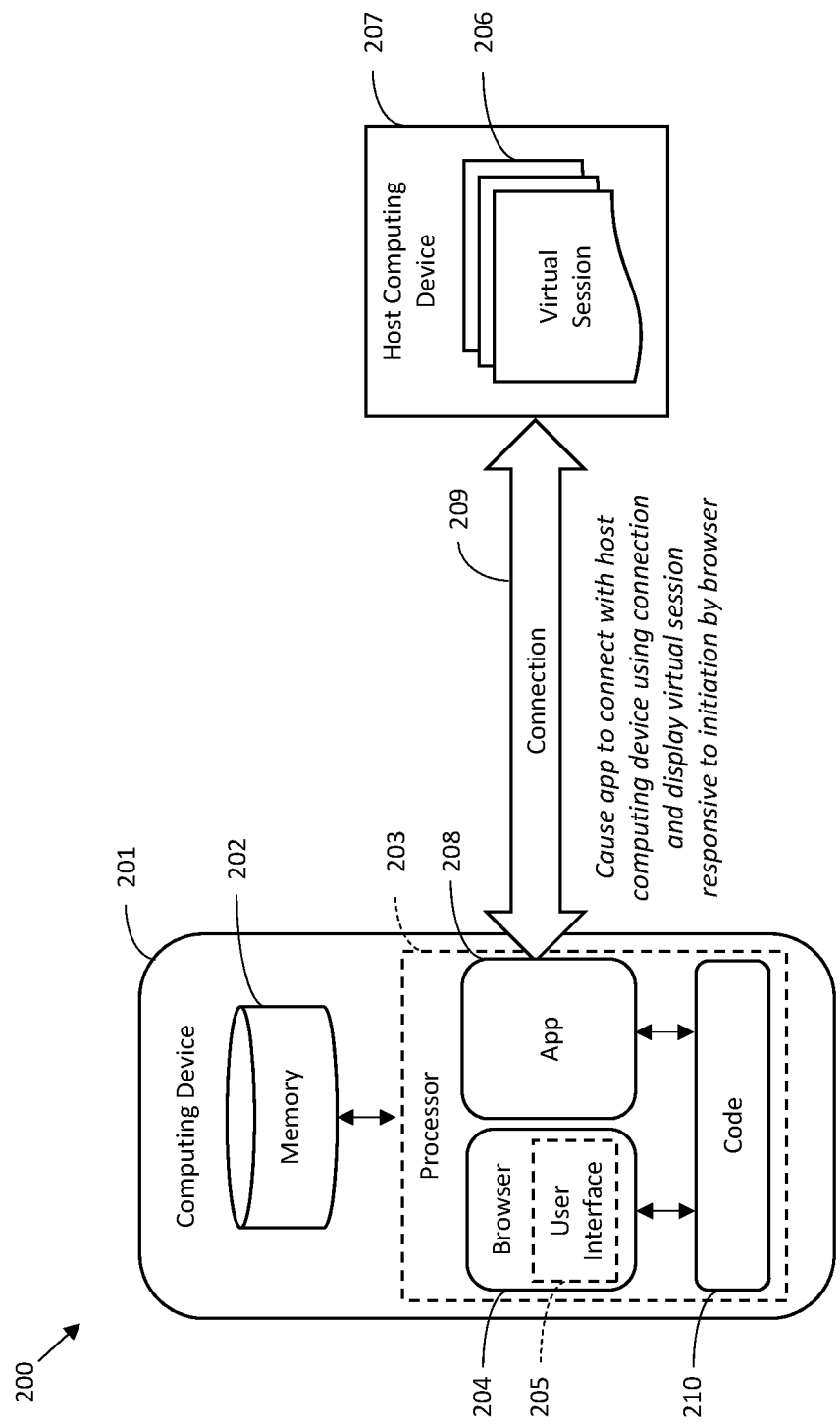
FIG. 6 is a schematic block diagram of a computing system providing virtual session launching from a browser based upon native app capabilities using connection leases.

Turning now to FIG. 6, a computing system 200 illustratively includes a computing device 201 which allows for browser launches of virtual sessions to be displayed within a native application, and which leverages a secure connection established by the native application. By way of example, the computing device 201 may be a client device, such as a desktop computer, laptop computer, tablet computer, smartphone, etc. The computing device 201 illustratively includes a memory 202 and a processor 203 configured to cooperate with the memory to run a browser 204 configured to generate a user interface 205 to initiate virtual sessions 206 (e.g., virtual desktops, virtual apps, Desktop as a Service (DaaS), Software as a Service (SaaS), etc.) from a host computing device 207, and an application or app 208 (e.g., a native app) configured to establish a connection 209 with, and display virtual sessions from, the host computing device. The processor 203 further runs code 210 (e.g., a browser extension) configured to cause the application 208 to connect with the host computing device 207 using the connection 209 and display a virtual session 206 responsive to initiation by the browser 204, as will be discussed further below.

An example architecture in which the endpoint device 201 may be used is now described with reference to the computing system 250 of FIG. 7. More particularly, the computing system 250 provides access to virtual sessions based upon connection leases. In the illustrated example, the connection lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace (CWA), and the client device 252 may be running Citrix Workspace App, although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

Figure 7:
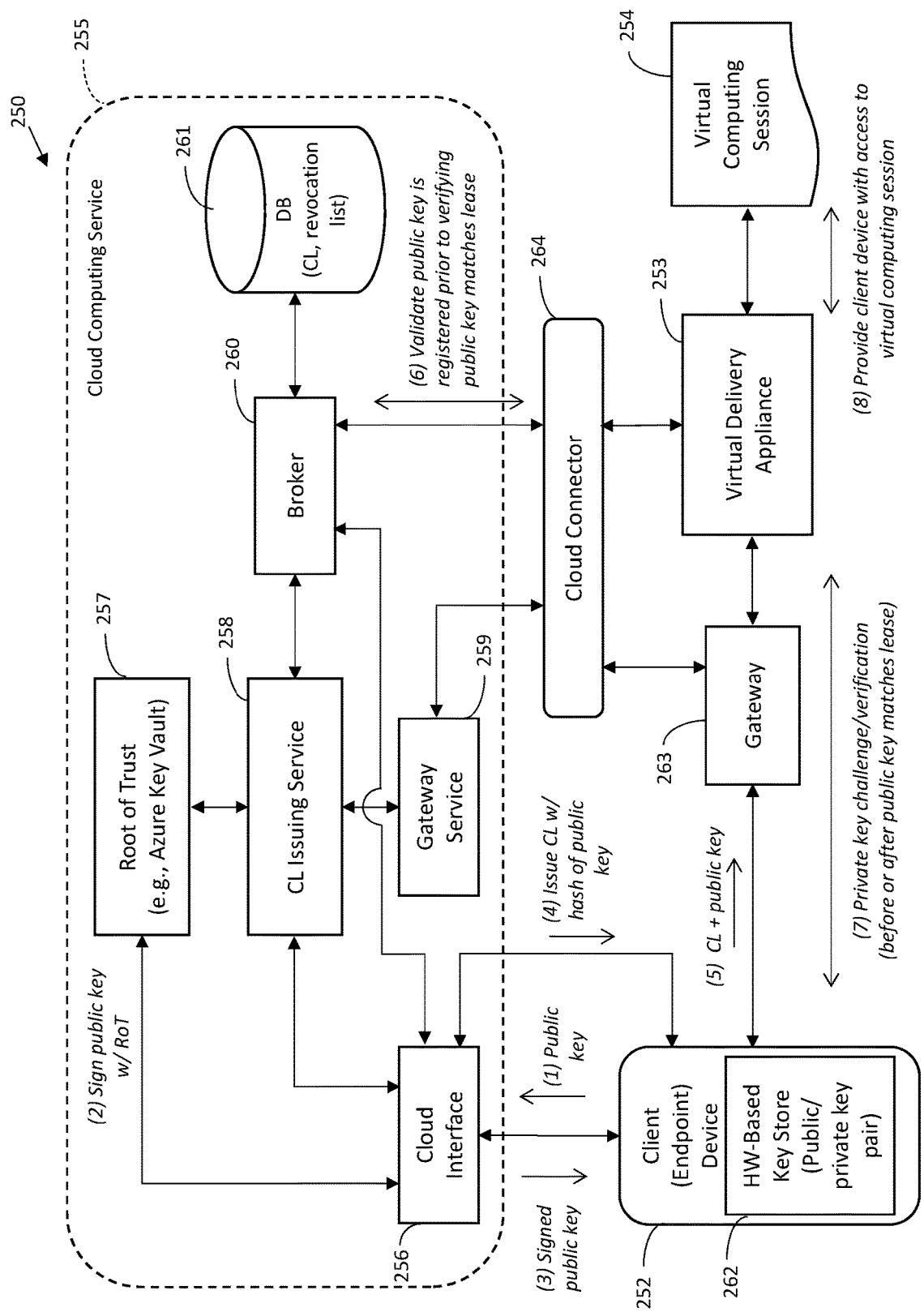
FIG. 7 is a schematic block diagram of a connection lease architecture and independent flow sequences in which the system of FIG. 6 may be implemented in accordance with an example embodiment.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases, in contrast to the legacy virtual delivery appliance 204 described above. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing. However, because the legacy virtual delivery appliances 204 described above with reference to FIG. 6 are not configured for such connection lease exchanges, these advantages would not otherwise be possible while using such legacy appliances.

Connection leases (CLs) provide long-lived, mostly static entitlements to published resources. Furthermore, Progressive Web App (PWA) Service Worker caching, which may also be used within the above-described architecture, allows for Web-based user interface (UI) (e.g., the Workspace UI) to be functional even in offline or degraded network conditions. In an example implementation, the system 250 will support native CWA apps. However, a significant amount of users may utilize a browser for the Workspace/StoreFront store 256, but also have a native CWA instance installed on the endpoint device 252, so that following the launch within the browser (Workspace Store) window, the native HDX Engine is invoked with the downloaded ICA (connection descriptor) file. This use case may be considered a "hybrid" case. This approach helps ensure familiar user experience (UX) with the browser and at the same time better HDX performance (e.g., for graphics, multimedia) and feature set (e.g. Smart Card, USB, Seamless Windows) compared to using an HTML5 HDX Engine in the browser.

There are also some use cases where no native CWA components are installed on the endpoint device 252. This is a zero-install configuration where both the Workspace Store 256 and the HDX Engine (HTML5-based) reside within the browser. This use case may be considered a "pure" browser case.

In both of these cases, the user authentication context is in the browser, and using a browser has unique challenges. For example, the browser does not offer the same level of security for asset storage as a native CWA instance, such as: access to the TPM, storage of private/public key pairs, signed public keys, Connection Leases (CL), Gateway Connection Tickets (GCT), Long Lived Auth Tokens (LLAuthT), Polymorphic Auth Tokens (PAuthT) for single sign on (SSOn) into HDX, etc. Another challenge is that the browser does not offer the same level of persistence, e.g., the browser could be configured to clear the cache upon exit, including device reboot.

Furthermore, the browser has a limited lifetime, in that it can be closed by a user after a brief use. This diminishes the opportunity for background operations that are important for resiliency, e.g., periodic download of CLs, which may otherwise be performed by a native app. Browsers may also have a significant attack surface, and access to native (raw) sockets is generally limited. Although WebSockets can be used to channel protocols such as secure connection lease protocols (which will be discussed further below), this requires adding WebSocket support to multiple backend systems such as Gateway, Connection, and VDA, which bears a higher engineering cost. In addition, with the browser there is no "user" awareness, which makes kiosk support for usage by multiple users on a shared kiosk device or terminal difficult and potentially unfeasible. Security, resiliency and performance of components such as UI caching, keys, CLs and various other user-device-bound tokens is important to maintain. Moreover, it may also be desirable to enable multi-user, multi-store and kiosk (shared terminal) use cases.

Figure 8:
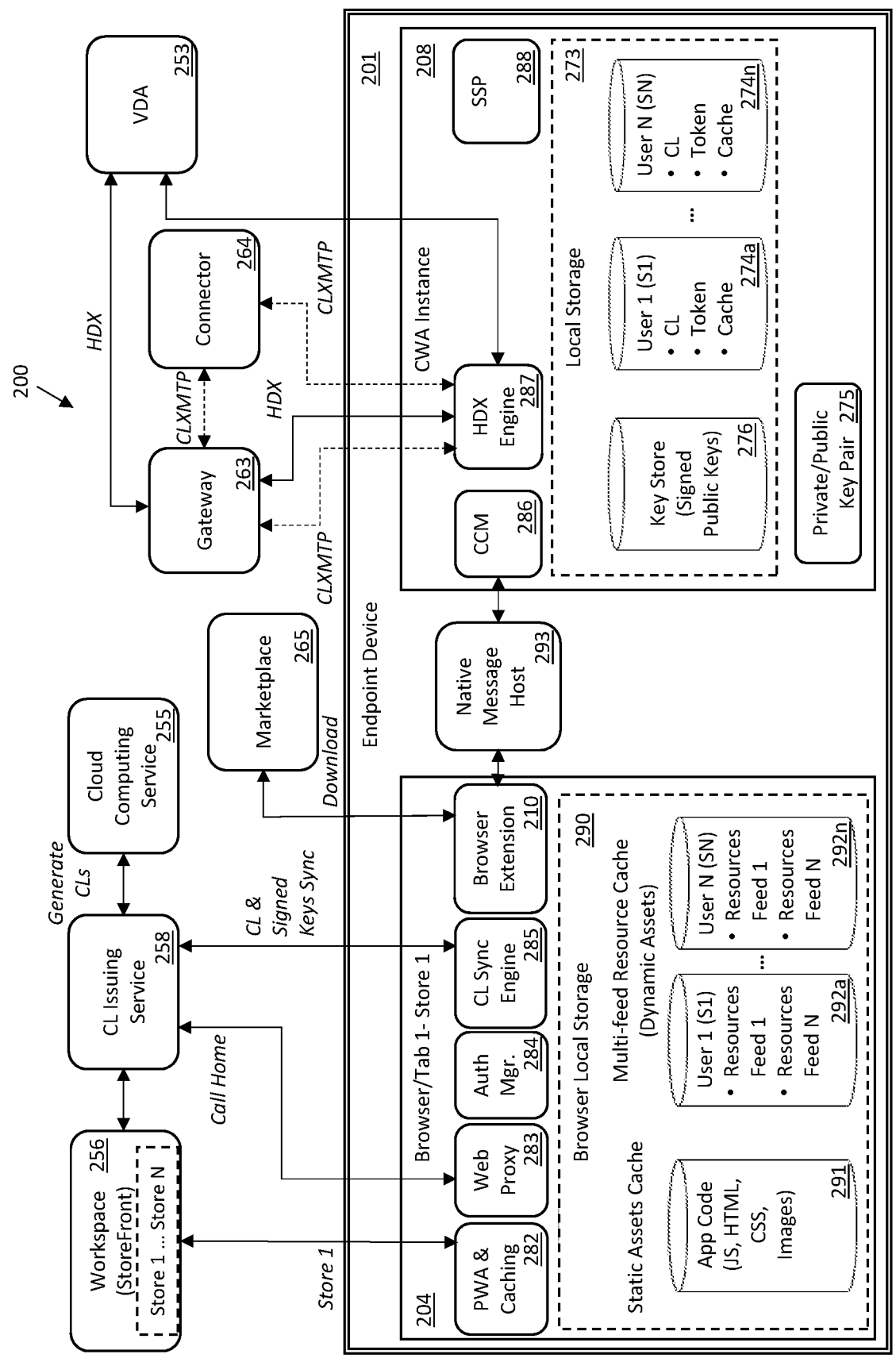
FIG. 8 is a schematic block diagram of an example implementation of the system of FIG. 6 within the connection lease architecture of FIG. 7.

Turning to FIG. 8, an example implementation of the system 200 which is implemented using the connection lease infrastructure set forth in FIG. 7 is now described. The browser 204 illustratively includes a Progressive Web App (PWA) and in-app caching module 282 for caching of static assets in static assets cache 291 of browser local storage (cache) 290. By way of example, the static assets may include app code such as Javascript (JS), hyper-text markup language (HTML), cascading style sheets (CSS), images, etc., which are used to render a user interface. Moreover, the PWA and in-app caching module 282 further provides multi-feed resource awareness and caches 292a-292n for dynamic assets including published assets (such as virtual apps and desktops). An authentication manager 284 may cooperate with PWA and in-app caching module 282 to perform the requisite authentication to retrieve and update the static/multi-feed assets in the caches 291 and 292a-292n.

The browser 204 further illustratively includes Web proxy code 283 (Web proxy) configured to perform calls home to the CLIS 258 to get online status and facilitate operation when the cloud computing service 255 is offline. That is, the Web proxy 283 helps ensure that the user interface can be loaded in an offline mode, and optionally that a reconnect banner can be used allowing for reconnection when the cloud computing service 255 comes back online. Javascript (JS) bridge methods may be utilized by the Web proxy 283 to get online status from the CLIS 258, for example. In addition, a CL synch engine 285 communicates with the CLIS 258 to perform operations such as CL and key synchronization, although in some embodiments these operations may optionally be delegated as background operations to the native CWA instance 208 when the browser 204 is closed, as will be discussed further below.

The native CWA instance 208 illustratively includes a common connection manager (CCM) 286 and an HDX engine 287 for communicating with a gateway 263, connector 264, and/or virtual delivery appliance 253 to access virtual resources (e.g., virtual apps/desktops, SaaS/DaaS servers, etc.), as discussed further above. A Self-Service Plugin (SSP) 288 may perform calls home to the CLIS 258 on behalf of the CWA instance 208. The endpoint device 201 further illustratively includes a native message host 293 which allows one or more browser extensions 210 to communicate with the CCM 286, as will be discussed further below.

These CLs are bound to the endpoint private/public key pair, such as by using the endpoint private/public key pair to encrypt the connection lease, or embedding a version of the endpoint public key signed by the RoT 257 in the connection lease, for example. In the illustrated example, user CLs are stored in a local file storage 273 in respective stores 274a-274n, and resource feeds are stored in respective stores 279a-279n. The endpoint private/public key pair may be stored in a key store 275 (e.g., by a TPM). Signed public keys (e.g., for the gateway 263, virtual delivery appliance 253, etc.) may be stored in a key store 276 in a local storage or cache 273.

In accordance with one example embodiment, the endpoint device 201, gateway 263, connector 264, and VDA 253 may utilize a connection lease exchange mutual trust protocol (CLXMTP) between one another to exchange and perform validation of the public keys and CLs of one another. In the illustrated example, the initial CLXMTP connection between these components (represented by two-way dashed arrows) is used for CL exchange and validation, while the subsequent HDX connections (represented by solid two-way arrows) are used to exchange information after validation has been performed via the CLXMTP connections, as shown.

To perform a CLXMTP CL exchange between the endpoint device 201 and the VDA 253, for example, the HDX engine 287 cooperates with the VDA to establish: (1) a transport layer session between the endpoint device and the virtual delivery appliance; (2) a presentation layer session via the transport layer session; and (3) a connection lease exchange tunnel via the presentation layer session. The VDA 253 may accordingly receive a connection lease from the endpoint device 201 through the connection lease exchange tunnel, and then perform the above-described lease validation process with the broker computing device 260. The VDA 253 may further issue a resource connection ticket to the endpoint device 201 through the connection lease exchange tunnel responsive to the validation. This process may be similarly performed between the endpoint 201 and the gateway 263, as well as between the gateway 263/VDA 253 and the connector 264.

By way of example, the presentation layer session may be a Common Gateway Protocol (CGP) session, and the transport layer session may be a Transport Layer Security (TLS) session or a Transmission Control Protocol (TCP) session. Also by way of example, the transport layer session may comprise at least one of an Enlightened Data Transport (EDT) session, Datagram Transport Layer Security (DTLS) session, and a User Datagram Protocol (UDP) session.

In the present example, the browser extension 210 and native messaging host 293 provide a secure bridge between the browser 204 and native CWA instances 208, relaying various types of control and data. This allows the browser 204 to advantageously initiate or launch published resources to access virtual sessions while leveraging the secure native CL and keys storage, and CLXMTP capabilities, of the CWA instance 208, as well as maintaining CL and token binding to the native CWA instance. Moreover, the example approach also allows for the reuse of existing functionality in the browser 204, e.g. user interface and resource caching. The native CCM 286 is securely bootstrapped by and communicates with the native messaging host 293, and maintains per-browser-tab contexts, etc. In some embodiments, Workspace 256 to CWA instance 208 communication may be encrypted and "hidden" from browser 204, if desired.

The CL sync engine 285 may support synchronization of multiple stores from the Workspace storefront 256. This could run in a global browser extension 210 background thread, helping ensure that the synchronization can be done in the background, although this may also be run in a per-tab (per-store) browser extension thread in some embodiments. The browser extension 210 may be downloaded from an online marketplace as a plugin app to the particular browser 204 being used (e.g., Chrome, Safari, Edge, etc.). Javascript bridge methods for storage of files (e.g., CLs and signed public keys) may be implemented in the browser extension 210 and relayed to the native CWA instance 208 for storage.

The browser extension 210 relays various types of control and data between the browser 204 and native CWA instance 208. By way of example, the following permissions may be declared in a browser extension 210 manifest: native communication ("nativeMessaging"); background ("background"); and multiple tabs ("tabs"). There can be a 1:1 relationship between a browser extension 210 for a given browser 204 and the native messaging host 293. In an example embodiment, the native message host 293 utilizes a Browser-Native Protocol (BNP) for relaying communications between the browser extension 210 and the CCM 286. The BNP may be extensible and backward compatible, since browser extension and native CWA instance 208 components may be updated independently. Thus, the native message host 293, rather than assuming any particular version of the browser extension 210, may negotiate with the browser extension to determine which features/syntax it supports, and communicate with the browser extension using the BNP accordingly.

The browser extension 210 can be downloaded via a marketplace 265 as noted above (or other sources based upon enterprise policy), while the native messaging host 293, CCM 286 and the rest of the native CWA instance 208 components are installed and updated as a native application. In some implementations, the browser extension 210 may trigger silent telemetry launches based on telemetry site properties. Some of the browser extension 210 and native messaging host 293 code may be shared between different browsers (e.g., Chrome and Edge Chromium), between Javascript bridge method implementations in browser extensions; and for the BNP protocol implementation. The following table provides a list of example information which may be sent from the CWA instance 208 to the browser 204, and vice-versa, using the BNP.

| CWA to Browser | Browser to CWA |
| --- | --- |
| Capability Negotiation: bind request, bind commit | Capability negotiation: bind response |
| Endpoint Public Key Status on CL launch, so browser could fall back to ICA File launch. | Connection Leases Signed Public Keys: {Endpoint Public Key} RoT, {CLIS Public Key(s)} RoT, RoT Public Key(s) - primary/current and secondary/previous |
| CL version | BE ID, BE Type |
| Supported crypto capabilities: encryption and hashing algorithms. | Tab ID |
| | User ID, customer ID Store URL Folder for CL Sync Launch request with reference to: 1. Published resource key GUID 2. Launch preference (CL vs. ICA File) 3. Correlation ID originating from BE Note: Native CWA may perform both CL resolution and HDX launches. A gateway connection ticket (GCT) is used for gateway connections. |
| CWA to Browser | Browser to CWA |
| --- | --- |
| | UI-related telemetry, e.g., for switching between online/offline mode, clicking on Reconnect Banner, etc. |

In some embodiments, the BNP protocol may support other features such as secure (protected) ICA file launches, and a Web-based connection status user interface, for example.

The CCM 286 hosts the BNP and communicates with the native messaging host 293 over a securely bootstrapped connection, e.g., an anonymous duplex named pipe. CCM 286 may be implemented as a single instance on an endpoint device 201. In general, there is a N:1 relationship between the browser extension 210/native messaging host 293 combo and CCM 286. That is, N browser tabs in the same or different browsers 204 communicate with a single instance of CCM 286. However, CCM 286 manages one or more communication contexts with the respective browser tabs. Each context may be identified by a [BE ID, Tab ID] and may also contain BE Type, User ID, Customer ID, Store URL, negotiated capabilities, etc.

Functionality of the CWA instance 208 which may be leveraged to implement the data exchange with the browser 204 may include: private/public key pair ownership; secure storage of signed public keys, LLAuthTs, PAuthTs, etc., as well as data protection (DP) API or key chain; storage of CLs per user, per store; CL parsing and decryption; attempting different options in CL, such as a zone depth first search, redirect target, fan-out, power management (deny with retry), etc.; CLXMTP via the gateway 263 and connector 264; temp ICA file generation for both the gateway (with GCT) and direct connections; silent telemetry launching; connector as a beacon; and SSOn to HDX with Long-lived Auth Tokens (LLAuthT) and Polymorphic Auth Tokens (PAuthT).

Security of communications may be handled natively by the browser extension 210 and using existing browser technology. In particular, the browser extensions 210 may be signed and deployed via the marketplace 263 (or otherwise via enterprise policy). Production browsers, e.g., Google Chrome, Microsoft Edge Chromium, Safari, only load signed browser extensions (plugins). Furthermore, the native messaging host 293 may be hard-coded to communicate with a specific browser extension 210 by ID. Likewise, a browser extension 210, as instructed by its manifest, is hardcoded to communicate with the native messaging host 293 (e.g., by path and module name). Furthermore, additional module signature validation may be required for replacing the native messaging host 293 in some embodiments, although even without such validation replacing it may otherwise require admin privileges, which still affords significant protection.

The native messaging host 293 plays a relaying role between the browser extension 210 and the CCM 286 (i.e., relaying messages back and forth). In an example embodiment, the native messaging host 293 carries out the following sequence of operations to securely bootstrap the communication between a browser extension 210 instance and the connection manager process:

(1) discover the unique connection manager process instance;

(2) verify the identity of the connection manager process (unique) instance to ensure that the connection manager process is not being spoofed—i.e. replaced with a malicious process;

(3) create two anonymous named pipes—one reader and one writer (anonymous named pipes are used to make it difficult to hijack the communication); and (4) provide the two anonymous named pipe handles to the CCM via an operating system inter-process communication (IPC) mechanism.

By way of example, on the Windows OS, steps (1) and (2) can be achieved as follows. The CCM 286 (e.g., a Win32 application) creates a hidden window. The native messaging host 293 looks up the hidden window via the Win32 EnumWindows function and retrieves a handle to the hidden window. From the hidden window handle the CCM 286 Process ID is retrieved via the Win32 GetWindowThreadProcessId function. From the CCM 286 process ID, the native messaging host 293 process obtains a handle to the CCM. The handle to the CCM 286 allows the native messaging host 293 to retrieve information about the process (e.g., its path). The native messaging host 293 may then verify that the path is the expected installation path for the CMM 293, and verify that the CCM binary is digitally signed by the expected entity (e.g., the company that produced the binary).

On the Windows OS, step (4) can be achieved in different ways. One is by sending a window message (e.g., with the Win32 PostMessage function). Another is by making an RPC/COM call to the CCM 293 (if it is playing the role of a COM server).

After receiving the two anonymous named pipe handles from the native messaging host 293, the CCM 286 performs the following steps: (1) create a reader/writer context (specific to the native messaging host); (2) open the two anonymous named pipes from their handles; and (3) prepare to read messages from reader anonymous named pipe and prepare to write messages to writer anonymous named pipe.

This approach advantageously leverages functionality already built for the browser 204 (Web-based) and native CWA instance 208. Moreover, it provides for secure communication between the browser 204 and native CWA instance 208, without interrupting other connection lease security measures such as CL and GCT user-device binding. Moreover, this approach improves the user experience of browser 204 to native CWA instance 208 IPC, while being transparent to user. For example, this approach allows for a single prompt to endorse a browser extension 210, as opposed to three prompts with WebHelper. It may also be leveraged for additional requirements, such as to protect ICA files, provide a Web-based connection status user interface, and allow for an HTML5 receiver to support native virtual channel (e.g. USB, etc.) desktop integration, for example. In some embodiments, a "background" permission may optionally be declared in the browser extension 210 manifest (e.g., in Chrome) to cause the browser 204 to start up early and shut down late, so that apps and extensions can have a longer life for performing synch and update operations, for example.

Figure 9:
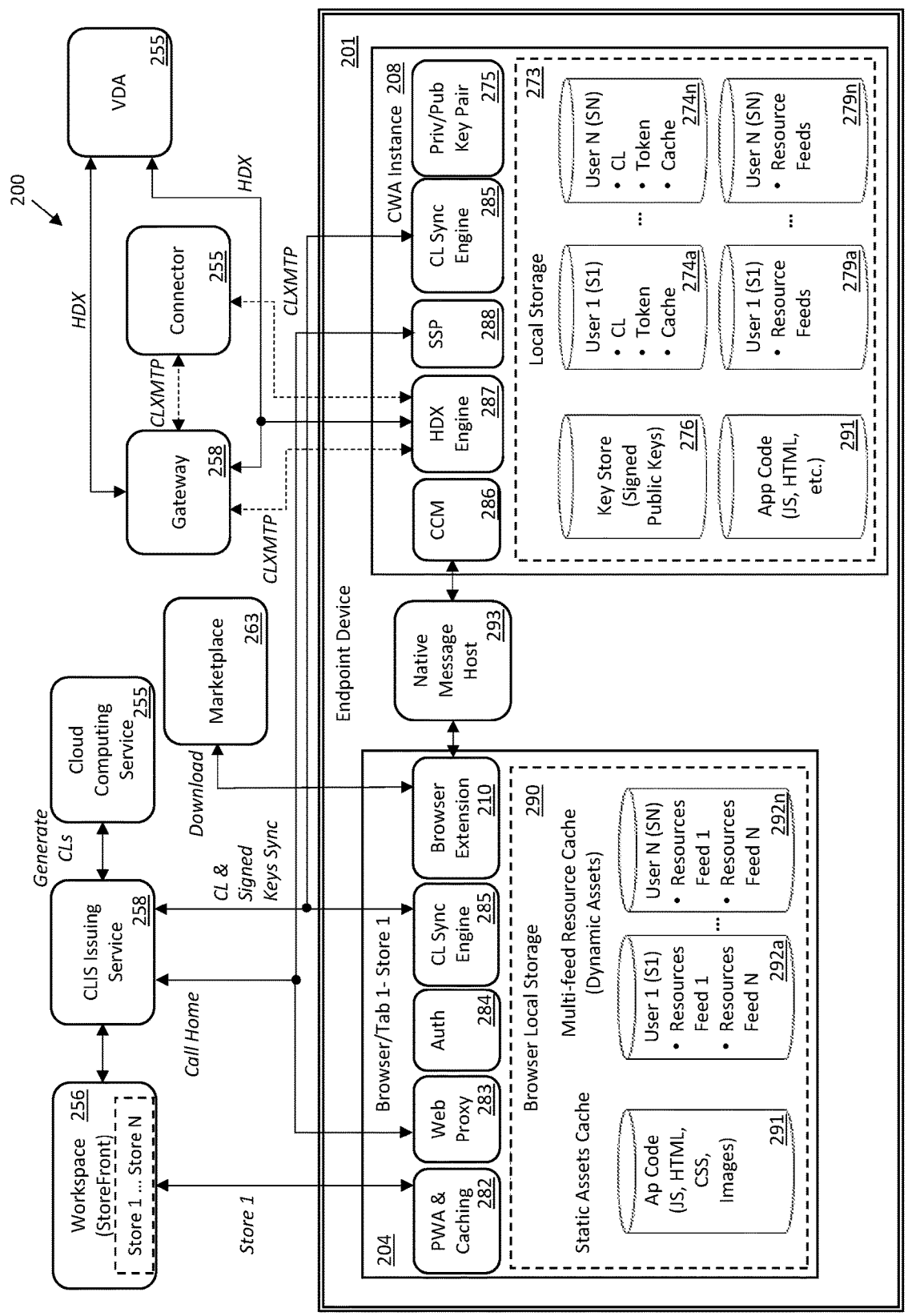
FIG. 9 is a schematic block diagram of another example implementation of the system of FIG. 6 within the connection lease architecture of FIG. 7.

Referring additionally to FIG. 9, another implementation of the system 200 is now described which helps to address issues with the lifetime of the user interface. More particularly, the browser 204 needs to be able to load the user interface including visual representations assets (user interface resource cache) even in offline or cloud outage conditions. These include the above-described static assets, namely app code (JS, HTML, CSS, images), and dynamic assets including the resources (apps, desktops) that the user is entitled to.

This can be practically achieved by leveraging custom user interface interception and caching techniques, e.g., based on the Axios library by Google, as opposed to simply relying on PWA service workers. In one example PWA implementation, PWA and Service Workers are configured to cache static assets: app code (JS, HTML, CSS, images). Service workers are configured to a network-first-fallback-to-cache caching strategy, because it is desirable to load the latest version of the app as opposed to, for example, loading a previous stale app version from cache. Also, custom in-app caching may be performed for dynamic assets, e.g., the resources (apps, desktops) the user is entitled to access. A cache-first-fallback-to-network or cache-network-race caching strategy may be used for performance reasons.

In an example embodiment, a WorxBox library can be used to implement service workers and caching. An Axios library can be used to communicate to the WorxBox by virtue of the requests it makes. The Axios library is effectively an interceptor for HTTP/HTTPS requests, and can be used to implement in-app caching. In the context of the present example, the cache can be extended to understand different locations of assets, such as local browser cache (DOM storage), and the native CWA cache 273 via browser extension 210.

More particularly, the present implementation has the ability to distinguish between static (app code) and dynamic (apps, desktops) assets, resources that are leasable, etc. The in-app caching may be extended to also delegate storage to the native CWA instance 208. Assuming the browser can lose the cache after restart/reboot, etc., then in app-caching can be used for the static assets also. The resource cache may be stored with native CWA per-user per-store. The browser extension 210 and native messaging host 293 channel can be utilized, and both static and dynamic assets can be stored in the local storage 273. Thus, even if the browser 290 local storage cache is cleared after a browser 204 restart or another event, then it could still be retrieved from the native CWA instance 208. In some implementations, only the native CWA cache 273 is used. Another option is to use both the browser local storage cache 290 (e.g., as level 1 cache) and the native CWA cache 273 (e.g., as level 2 cache).

This approach to addressing browser 204 lifetime may be appropriate to improve resiliency in a use case where the lifetime of the browser 204 may be very limited and insufficient to request and sync down CLs and keys frequently enough. It further improves resiliency by running LeaseCallHome and the CL sync engine 285 in the native CWA instance 208 as background operations (e.g., LeaseCallHome requests, signing of the endpoint public key, and requests CLs and signed public keys (RoT and CLIS)). The CL sync engine 285 syncs down CLs and signed public keys, for example. In one implementation, these operations may be run in the browser 204 while the browser is active, but when the browser is closed they are run from the native CWA instance 208. Still another option is to always run these operations from the native CWA instance 208.

Device registration with Workspace 256 and/or a device registration service may be bound to the CWA instance 208 private/public key pair. For example, as part of registration, a device bearer token may be issued for use in front-end authentication. The device bearer token may have the form: {Device ID, Endpoint Pub Key} signed by RoT 257. Following user and device authentication, LLAuthT may be issued, which is also user-device bound, and can used in the LeaseCallHome and CL sync engine 285 from the browser 204 and/or native CWA instance 208. In both cases, LLAuthT validation can be performed based on the native app's private/public key pair. The device bearer token, LLAuthT, and signed public keys may be stored in protected storage, e.g., Data Protection (DP) API or key chain.

Where native (raw) sockets are available in the browser 204 (e.g. supported by Google Chrome) or, alternatively, WebSockets are used and backend systems are upgraded to support WebSockets, then all network communication including CLXMTP and HDX may be performed within the browser 204. The browser extension 210 and native messaging host 293 may still be utilized for secure and persistent access to keys, CLs, resource cache, etc. in the native CWA instance 208.

In some embodiments, various functionality of the CWA instance 208, such as that of the HDX engine 287 and secure local storage 273, may be built into the browser extension 210. In such cases, the browser extension 210 would not need to leverage these capabilities of the native CWA instance 208, and the virtual sessions may be displayed within the user interface of the browser 204. In yet another example embodiment, this functionality may be incorporated directly within the browser 204, such that a separate browser extension need not be used.

Figure 10:
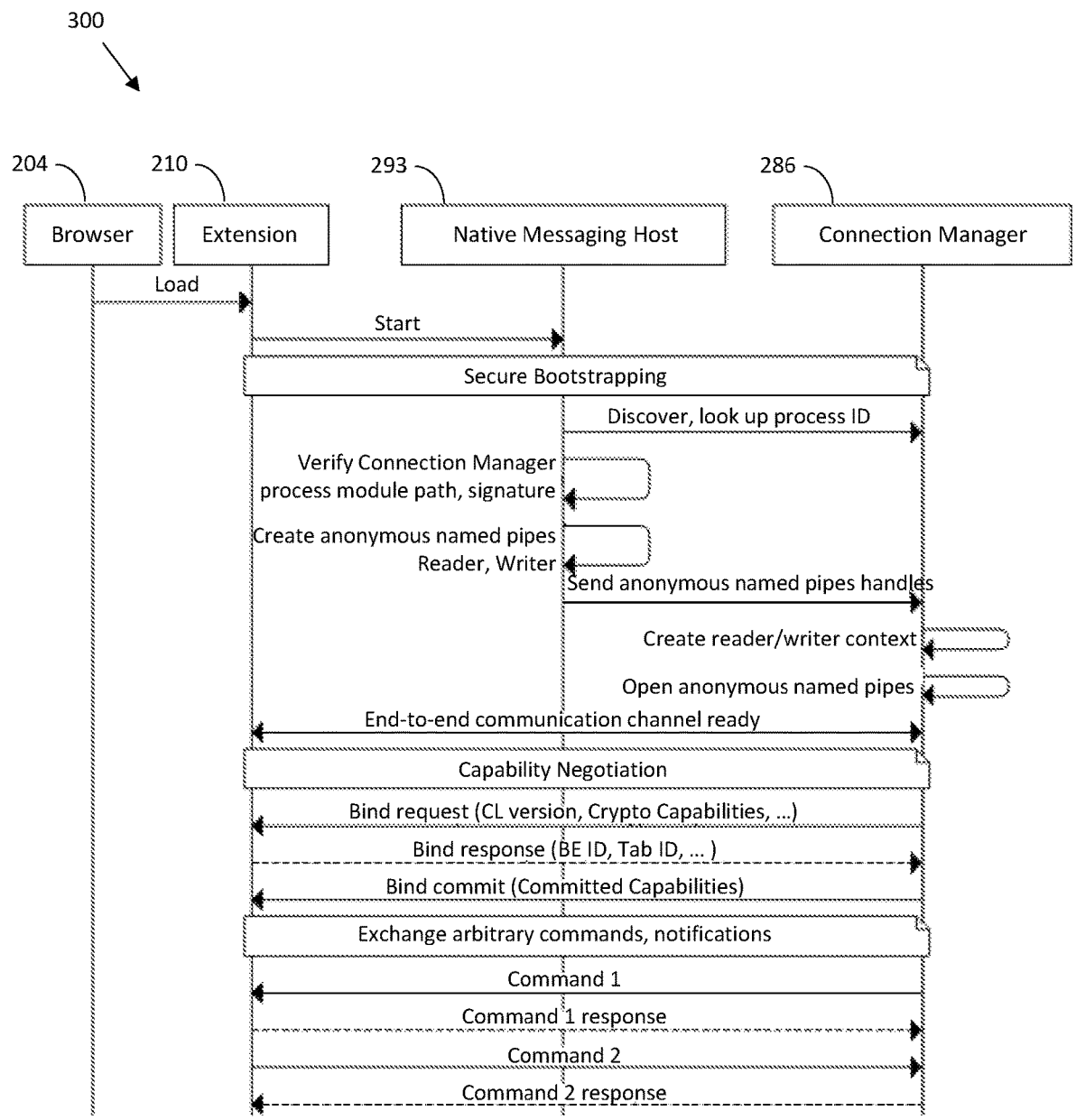
FIG. 10 is a sequence flow diagram illustrating a secure bootstrapping operation which may be performed by the systems of FIG. 8 or 9.

Referring to the sequence diagram 300 of FIG. 10, the above-noted secure bootstrapping and capability operations are now further described. Upon selection of a published resource (e.g., app, desktop, SaaS, Daas, etc.) within the user interface generated by the browser 204, the browser extension 210 causes the native messaging host 293 to start the secure bootstrapping operations. The native messaging host 293 discovers the process ID from the CCM 286, and verifies the process module path and signature, creates anonymous named pipes (Reader/Writer) as discussed above, and sends the anonymous named pipes handles to the CCM. The CCM 286 creates the readers/writer context and opens the anonymous named pipes, thereby establishing an end-to-end communication channel with the browser extension 210.

A capability negotiation then occurs, in which the CCM determines what features or capabilities the browser extension 210 supports based upon its particular version or browser it is associated with. A bind request performed during this process involves the CCM 286 making known the various capability sets it supports, the browser extension 210 selecting which set it wants to use, and the CCM committing to the selected set. The illustrated sequence concludes with an exchange of arbitrary commands and notifications, which are the transactions used to launch a virtual session. Such transactions may include calls home, CL storage, lease launch, etc.

Figure 11:
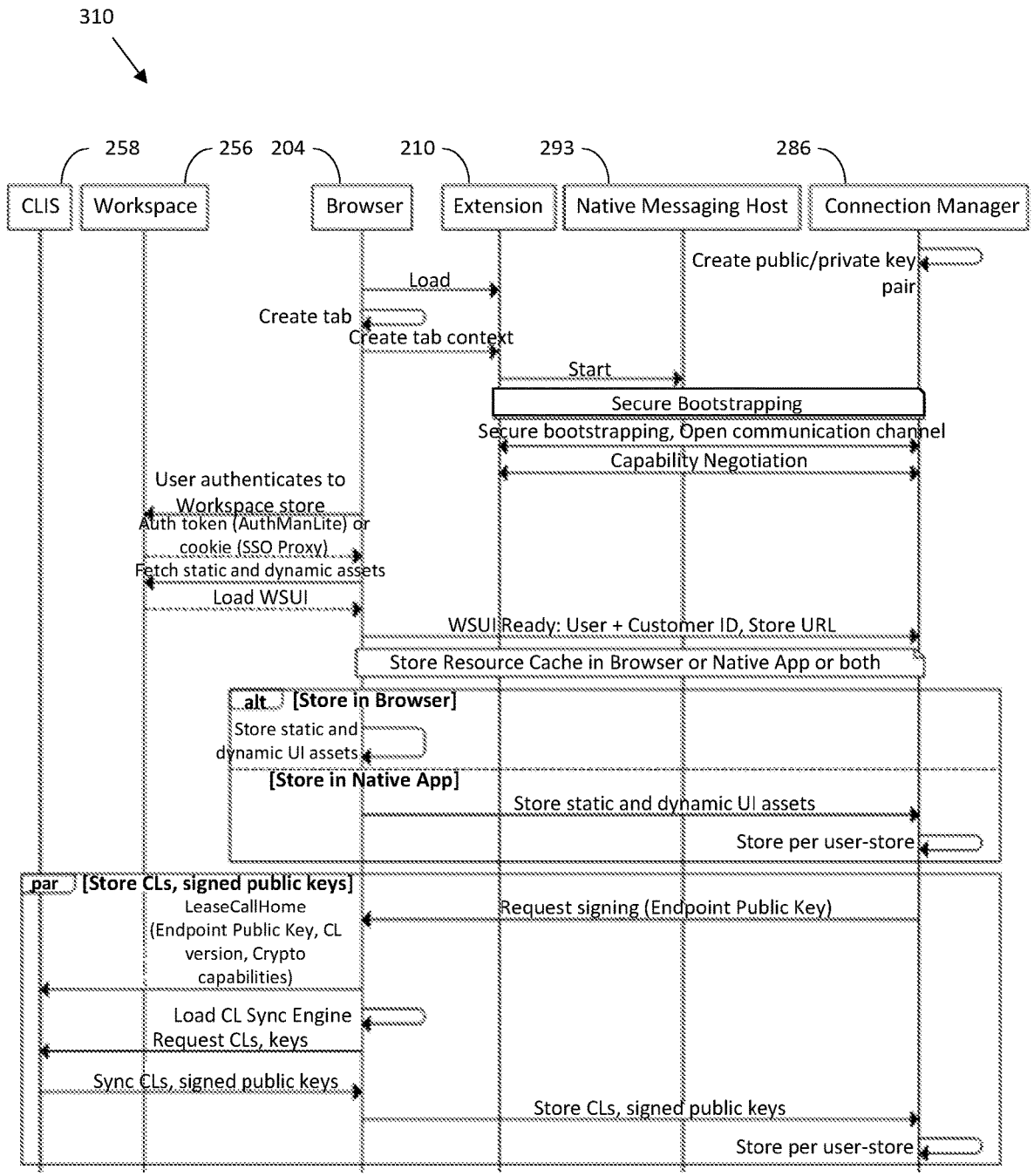
FIG. 11 is a sequence flow diagram illustrating user and store initialization operations which may be performed by the systems of FIG. 8 or 9.

A user and store initialization flow is now described with reference to the sequence diagram 310 of FIG. 11. The CCM 286 first creates a public/private key pair, and the secure bootstrapping process described above with reference to FIG. 10 is performed. User authentication to the Workspace store 256 is then performed, and the resource cache, CLs, and LL Auth tokens are stored in the browser 204 or CWA instance 208, or both, as discussed above. For the architecture shown in FIG. 8, static and dynamic user interface assets may be stored in the browser 204, or alternatively for the architecture of FIG. 9 they may be stored at the CWA instance 208. In a parallel process, the CWA instance may request signing of the endpoint public key by the browser 204, and the browser performs a lease call home to the CLIS 258 to obtain the CLs and signed public key for the CCM 286, which it stores at the CWA instance 208.

Figure 12:
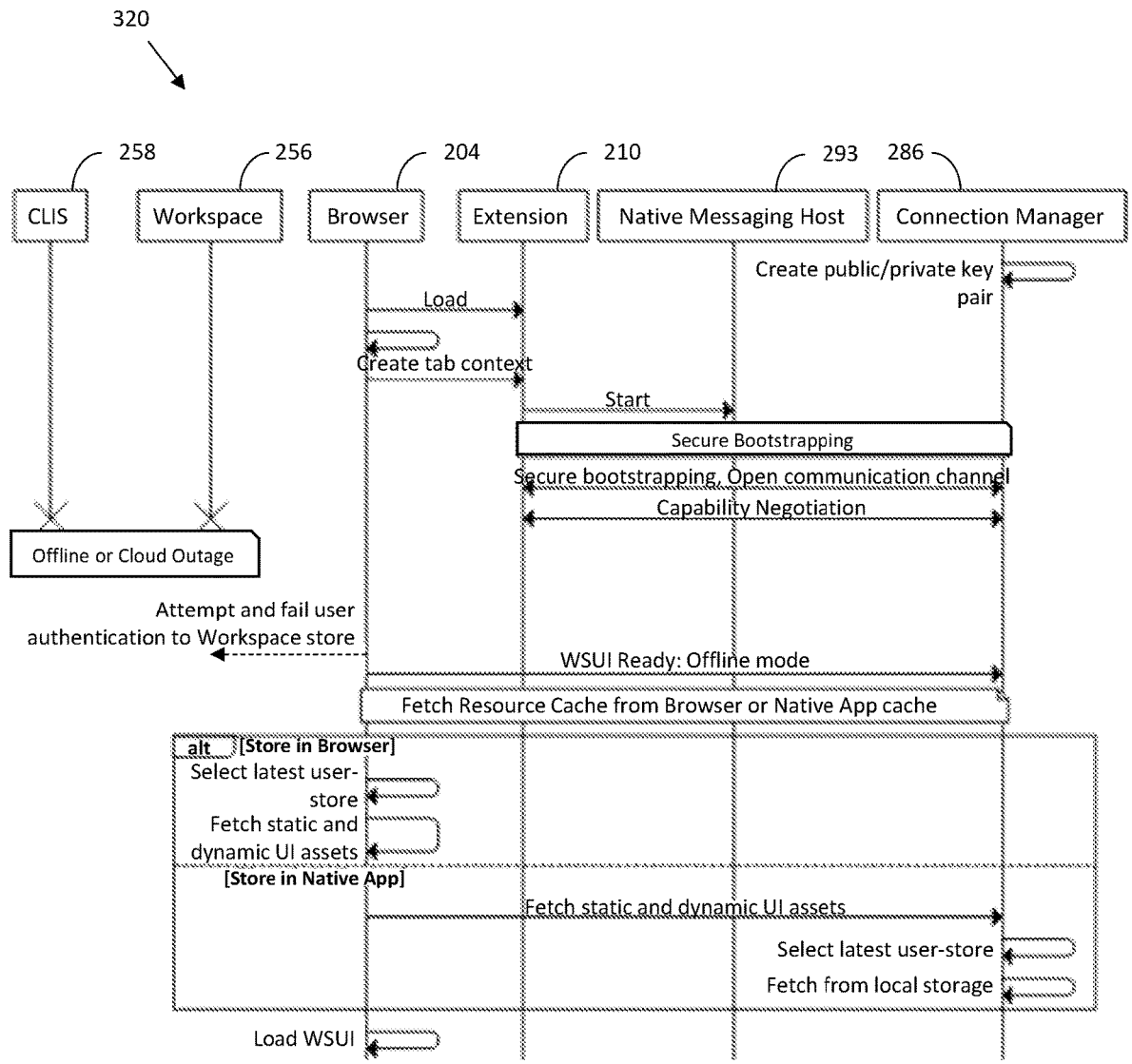
FIG. 12 is a sequence flow diagram illustrating user store initialization in offline and outage conditions which may be performed by the systems of FIG. 8 or 9.

User and store initialization in offline and outage conditions is now described with reference to the sequence diagram 320 of FIG. 12. The sequence is the same as described above with respect to FIG. 11 until the browser 204 attempts and fails the user authentication with the Workspace store 256, at which point it makes the user interface ready in an offline mode. In the case of the architecture shown in FIG. 8, the latest user store is selected and the corresponding static and dynamic user interface assets are retrieved from the browser local storage 290. Alternatively in the case of the architecture of FIG. 9, the static and dynamic assets are fetched from the local storage 273. It should be noted that in this example embodiment, the last authenticated user is assumed for purposes of fetching the stored static and dynamic assets.

Figure 13:
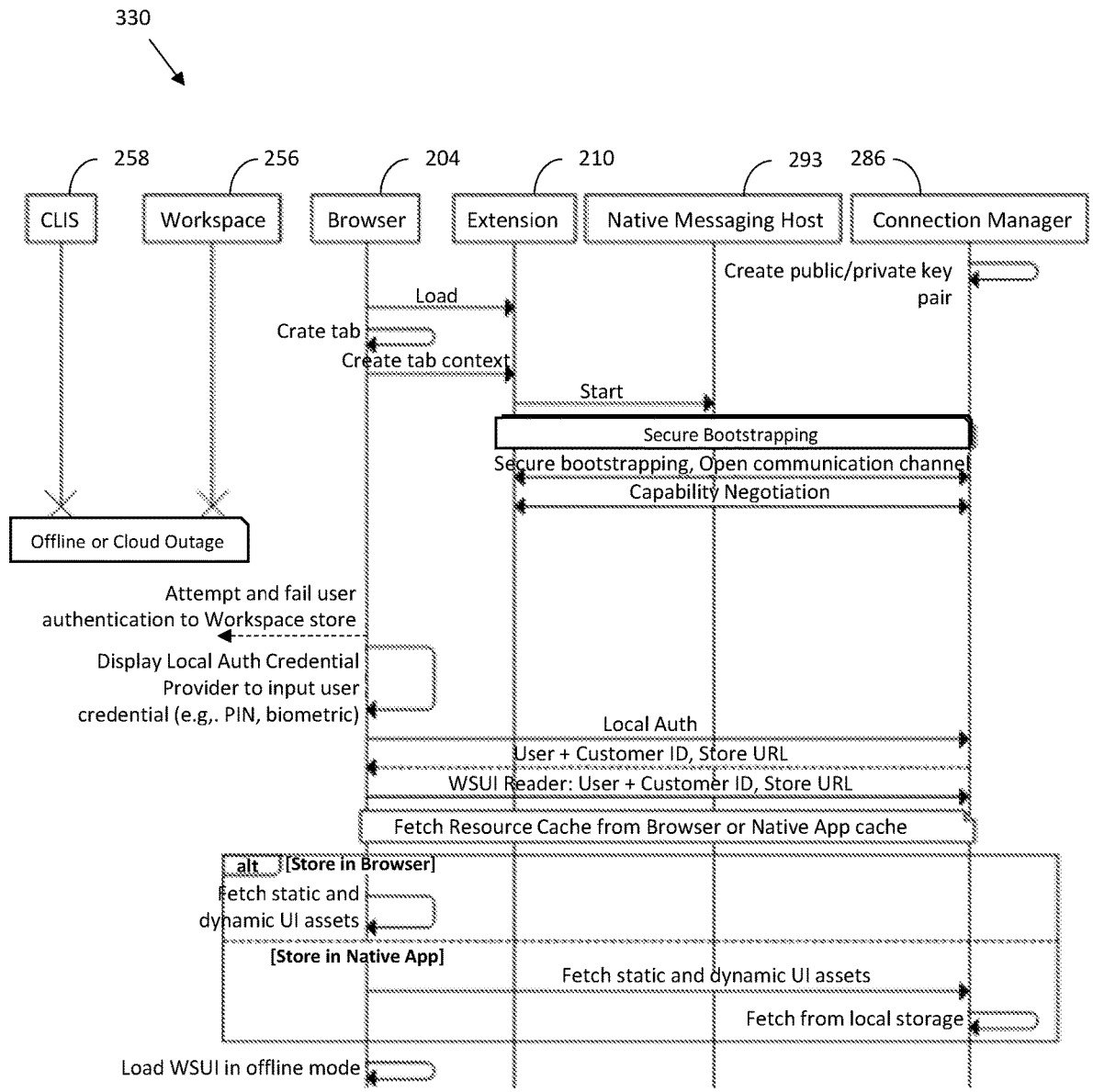
FIG. 13 is a sequence flow diagram illustrating an alternative approach to user and store initialization in offline or outage conditions which may be performed by the systems of FIG. 8 or 9.

An alternative approach to user and store initialization in offline or outage conditions is shown in the sequence diagram 330 of FIG. 13, yet with a local authentication to verify the user before proceeding. The steps in this sequence flow are the same as described above with reference to FIG. 12, except that when the browser 204 fails to authenticate the user with the Workspace store 256, a local authentication credential input device allows the user to input a credential such as a PIN, biometric, or smart card, for example. Once the this authentication is performed between the browser 204 and the CCM 286, the static and dynamic assets may be retrieved as discussed further above and the user interface loaded in an offline mode. This approach may accordingly be appropriate for shared terminal (kiosk) applications where multiple users share a common endpoint device 201, for example.

Figure 14:
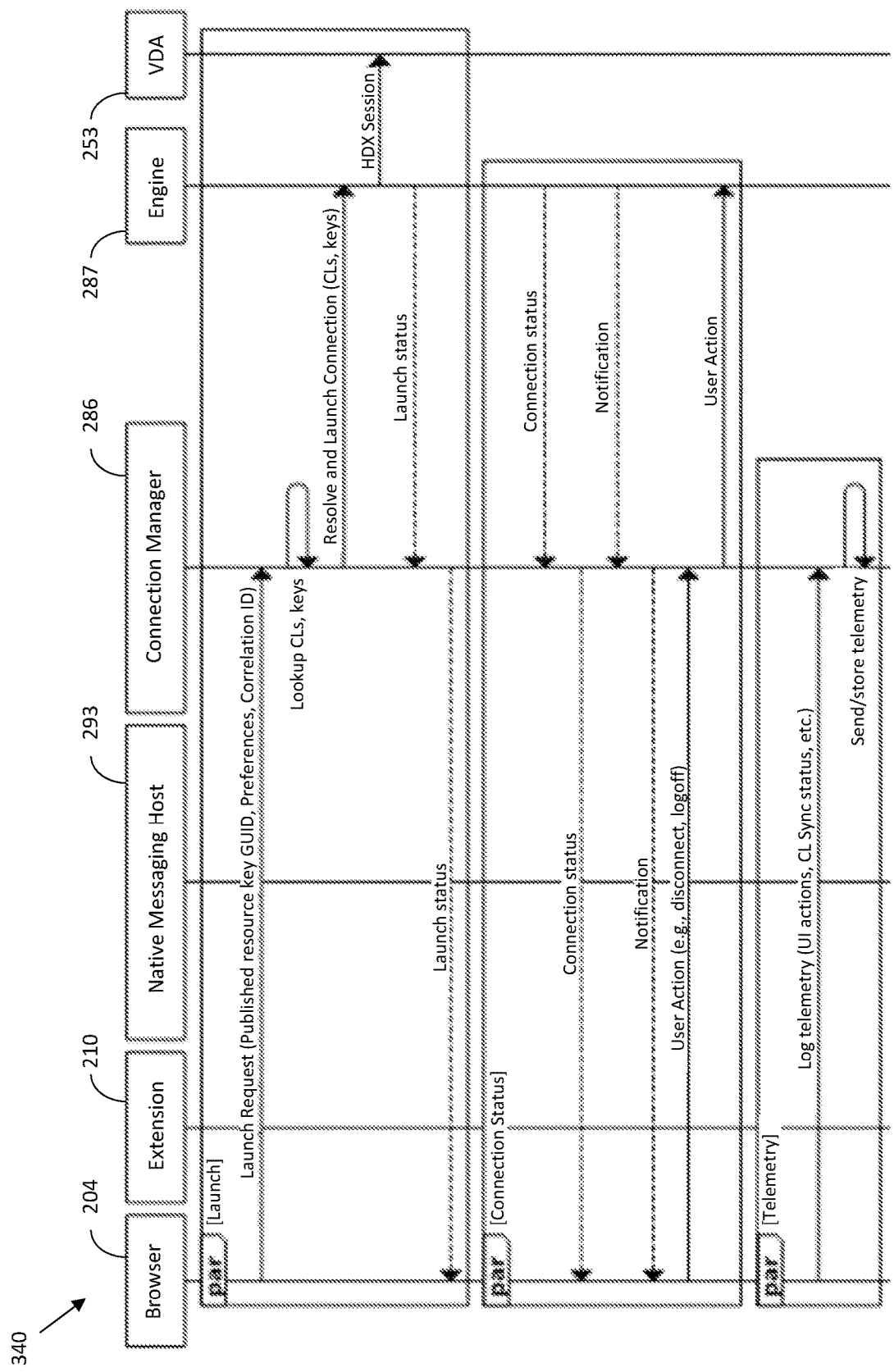
FIG. 14 is a sequence flow diagram illustrating a launch with connection status which may be performed by the systems of FIG. 8 or 9.

Turning to the sequence diagram 340 of FIG. 14, a launch with connection status sequence flow is now described. The browser 204 sends a launch request to the SSM 286 including a published resource key GUID for the resource to be launched, along with associated preferences, etc. The CCM 286 looks up the associated CLs and keys, and resolves and launches a connection between the HDX engine 287 and the VDA 255, and the HDX engine propagates the launch status back to the browser 204. In an optional parallel operation, the HDX engine 287 may provide a connection status to the browser 204 to display, providing a better user experience with branding, if desired. In another optional parallel operation, rather than performing logging within the browser 204, logging may be performed with a separate app (e.g., Google Analytics, etc.), which helps reduce the browser 204 workload.

Figure 15:
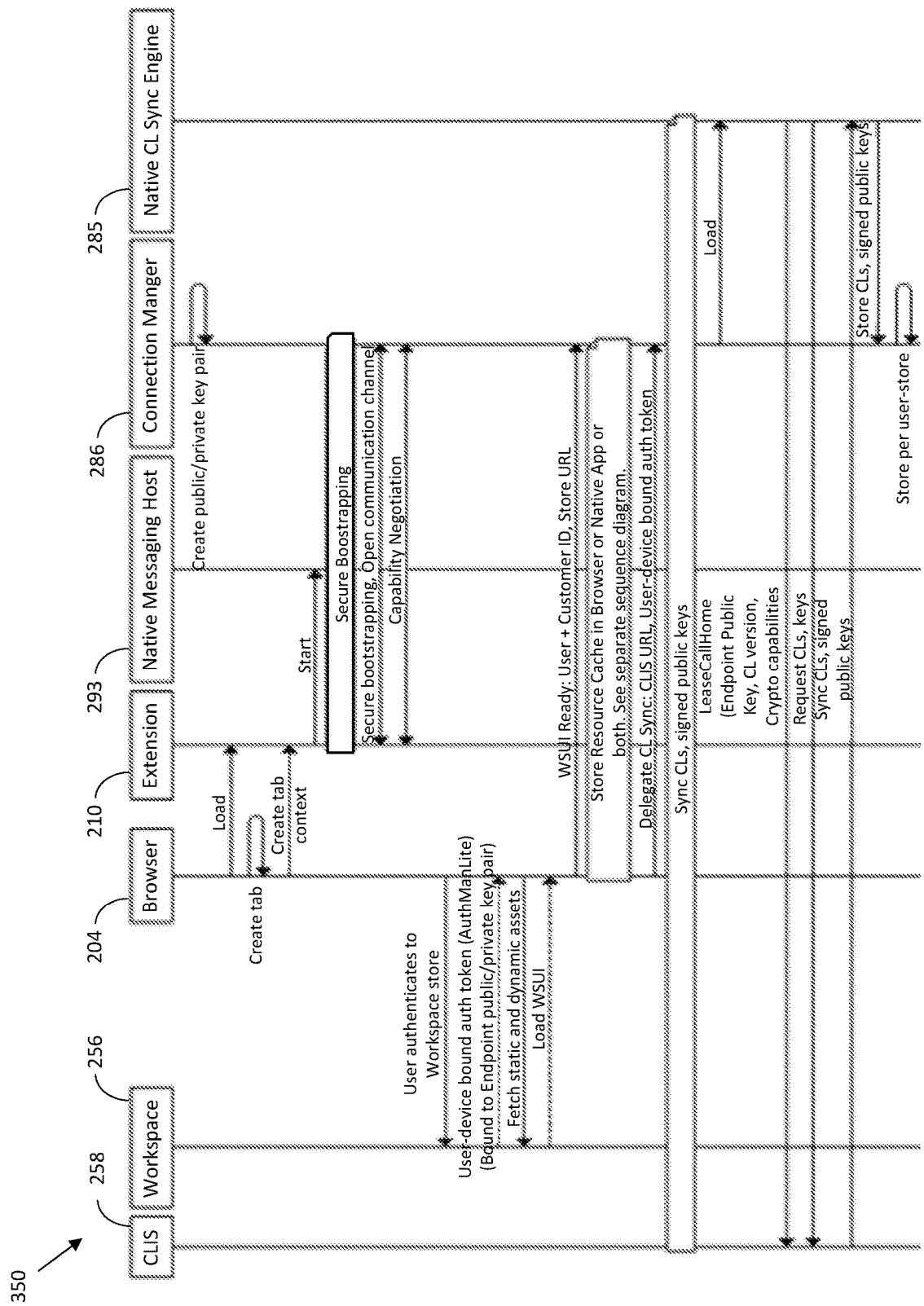
FIG. 15 is a sequence flow diagram illustrating a delegated native connection lease synchronization which may be performed by the systems of FIG. 8 or 9.

Referring additionally to the sequence diagram 350 of FIG. 15, a delegated native CL synchronization is now described. The browser 204 initiates the secure bootstrapping operations and user authentication operations, and the resource cache is stored in the browser or native CWA instance 208 as discussed above. However, in the present example, the browser 204 delegates the CL synch to the CCM 286, giving the CCM the user device auth token. This is advantageous in that even if the browser 204 is terminated, the native CWA instance 208 may still continue to perform call home operations with the CLIS 258 to perform CL and signed public key synchronization, as shown.

In the above examples, the secure bootstrapping operations are performed responsive to launching of a published resource by the browser 204. However, it should be noted that in some embodiments the secure bootstrapping could be performed before the browser 204 launches published resources from the user interface.

It should be noted that the approaches set forth above may be applied to various CL use cases, e.g., for Web/SaaS apps, cloud storage (e.g., Citrix Files), CEM native apps, etc. Additional use cases allow for the secure browser extension 210 to native messaging host 293 to CCM 286 mechanism to be leveraged for improving user experience and security of Browser-to-native app IPC mechanisms. For example, this may allow for the replacement of existing "WebHelper" mechanisms in some scenarios with a secure and robust bi-directional IPC mechanism. Moreover, the example approach may help eliminate multiple confirmation prompts such as with WebHelper implementations. Moreover, the above-described approaches allow for an enhanced Web-based connection status user interface providing consistent, always-green, brandable and configurable Web-based connection status indicators presented by the user interface in the browser 204.

Figure 16:
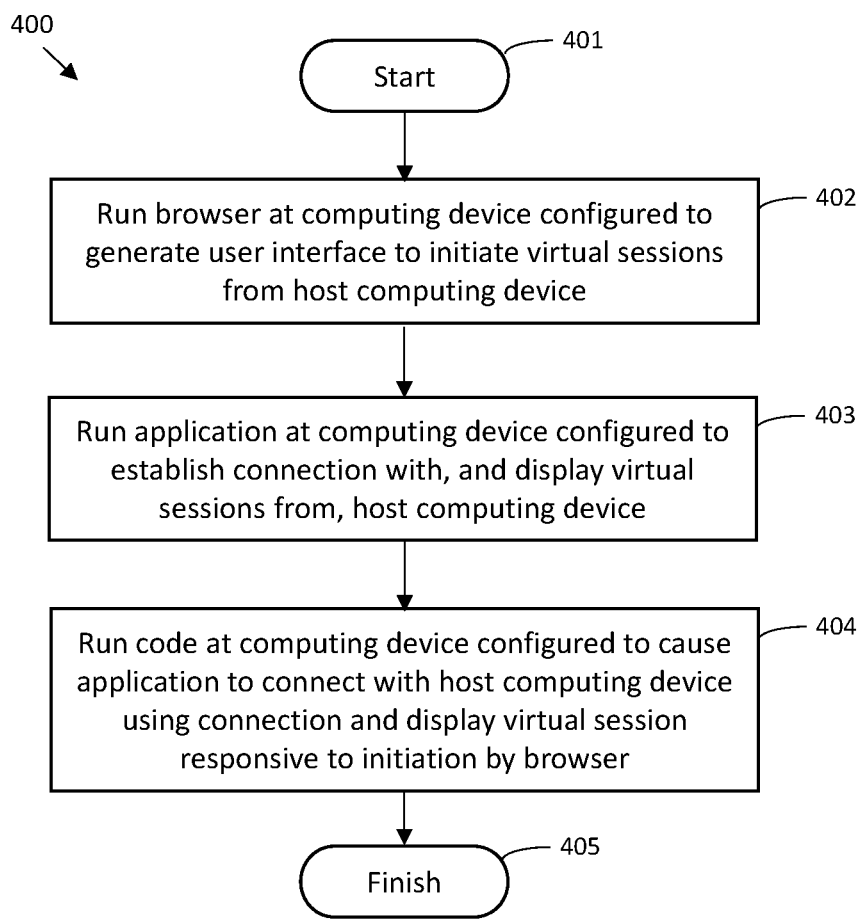
FIG. 16 is a flow diagram illustrating example method aspects associated with the system of FIG. 6.

Turning to the flow diagram 400 of FIG. 16, a related method is now described. Beginning at Block 401, the method illustratively includes running a browser 204 at a computing (endpoint) device 201 (Block 402) configured to generate a user interface 205 to initiate virtual sessions 206 from a host computing device 207, and running an application 208 at the computing device (Block 403) configured to establish a connection 209 with, and display virtual sessions from, the host computing device. The method further illustratively includes running code 210 at the computing device 201 configured to cause the application 208 to connect with the host computing device 207 using the connection 209 and display a virtual session 206 responsive to initiation by the browser 204, at Block 404. The method of FIG. 16 illustratively concludes at Block 405.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
a memory and a processor configured to cooperate with the memory to run
a browser configured to generate a user interface,
a native application configured to establish a connection with a host computing device configured to provide a virtual session, and
a browser extension configured to cause the native application to establish the connection with the host computing device responsive to initiation by the browser, and cause the browser to display the virtual session via the connection between the native application and the host computing device;
wherein the native application is configured to store a connection lease bound to the native application in the memory, and
establish the connection based upon the connection lease; and the browser extension is further configured to synchronize the connection lease with a connection lease service.

2. The computing device of claim 1 wherein the browser has a browser type associated therewith; and wherein the processor is further configured to run a messaging host associated with the browser type for relaying communications between the browser extension and the native application.

3. The computing device of claim 2 wherein the browser comprises a plurality of browsers having different browser types; wherein the messaging host comprises a different message host associated with individual browser types; and wherein the native application comprises a common connection manager configured to communicate with the different message hosts.

4. The computing device of claim 1 wherein the connection lease has a private/public key pair associated therewith comprising a private key and a public key; wherein the connection lease is generated based upon the public key; and wherein the native application is configured to access.

5. The computing device of claim 1 wherein the native application stores a connection ticket in the memory and establishes the connection with the host computing device based upon the connection ticket.

6. The computing device of claim 1 wherein the native application is configured to determine a capability associated with the browser extension, and communicate with the browser extension based upon the determined capability.

7. The computing device of claim 1 wherein the browser is configured to generate the user interface based upon a user interface cache; and wherein the native application is configured to obtain the user interface cache from a resource.

8. The computing device of claim 7 wherein the native application is further configured to store the user interface cache in the memory, obtain updates to the user interface cache from the resource, and provide the stored user interface cache to the browser through the browser extension responsive to unavailability of a cloud authentication store to provide updates.

9. The computing device of claim 1 wherein the browser is configured to generate the user interface responsive to the native application establishing the connection based upon the browser extension.

10. A method comprising:
running a browser at a computing device configured to generate a user interface;
running a native application at the computing device configured to establish a connection with a host computing device configured to provide a virtual session; and
running a browser extension at the computing device configured to cause the native application to establish the connection with the host computing device responsive to initiation by the browser, and cause the browser to display the virtual session via the connection between the native application and the host computing device;
wherein the native application is configured to store a connection lease bound to the native application in a computer memory, and establish the connection based upon the connection lease; and the browser extension is further configured to synchronize the connection lease with a connection lease service.

11. The method of claim 10 wherein the browser has a browser type associated therewith; and further comprising running a messaging host associated with the browser type at the computing device for relaying communications between the browser extension and the native application.

12. The method of claim 11 wherein the browser comprises a plurality of browsers having different browser types; wherein the messaging host comprises a different message host associated with individual browser types; and wherein the native application comprises a common connection manager configured to communicate with the different message hosts.

13. The method of claim 10 wherein the connection lease has a private/public key pair associated therewith comprising a private key and a public key; wherein the connection lease is generated based upon the public key; and wherein the native application is configured to access the private key and validate the connection lease based upon the private key.

14. A non-transitory computer-readable medium having computer-executable instructions for causing a computing device to perform steps comprising:
    running a browser at a computing device configured to generate a user interface;
    running a native application at the computing device configured to establish a connection with a host computing device configured to provide a virtual session; and
    running a browser extension at the computing device configured to cause the native application to establish the connection with the host computing device responsive to initiation by the browser, and cause the browser to display the virtual session via the connection between the native application and the host computing device;
    wherein the native application is configured to store a connection lease bound to the native application in a memory of the computing device, and establish the connection based upon the connection lease; and
    the browser extension is further configured to synchronize the connection lease with a connection lease service.

15. The non-transitory computer-readable medium of claim 14 wherein the browser has a browser type associated therewith; and further comprising computer-executable instructions for causing the computing device to run a messaging host associated with the browser type at the computing device for relaying communications between the browser extension and the native application.

* * * * *